(12) United States Patent
Coleman et al.

(10) Patent No.: US 11,664,661 B2
(45) Date of Patent: May 30, 2023

(54) SYSTEM AND METHOD FOR CONTROLLING AN ELECTRICAL LOAD

(71) Applicant: Open Energi Limited, London (GB)

(72) Inventors: Toby John Coleman, London (GB); Stephen John Galsworthy, Amsterdam (NL)

(73) Assignee: Open Energi Limited, London (GB)

( * ) Notice: Subject to any disclaimer, the term of this patent is extended or adjusted under 35 U.S.C. 154(b) by 0 days.

(21) Appl. No.: 17/216,898

(22) Filed: Mar. 30, 2021

(65) Prior Publication Data

US 2021/0218276 A1 Jul. 15, 2021

Related U.S. Application Data

(63) Continuation of application No. 16/306,146, filed as application No. PCT/GB2017/051557 on May 31, 2017, now Pat. No. 10,971,947.

(30) Foreign Application Priority Data

Jun. 2, 2016 (GB) ...................................... 1609687

(51) Int. Cl.
*H02J 3/14* (2006.01)
*H02J 13/00* (2006.01)

(52) U.S. Cl.
CPC .......... *H02J 3/14* (2013.01); *H02J 13/00028* (2020.01); *H02J 2310/12* (2020.01)

(58) Field of Classification Search
CPC ............. H02J 13/00028; H02J 2310/12; H02J 2310/50; H02J 1/00
See application file for complete search history.

(56) References Cited

U.S. PATENT DOCUMENTS 5,576,700 A * 11/1996 Davis ................ H02J 13/00028
340/3.31
5,963,457 A * 10/1999 Kanoi ....................... H02J 3/04
700/286
(Continued)

FOREIGN PATENT DOCUMENTS

EP 3046200 A1 7/2016
GB 2361118 A 10/2001
(Continued)

*Primary Examiner* — Qutbuddin Ghulamali
(74) *Attorney, Agent, or Firm* — Carmody Torrance Sandak & Hennessey LLP

(57) ABSTRACT

A system and method for controlling a number of load controllers (10), each of which is operatively connected to one or more electrical loads (6) that are connected to a grid, results in a reduction in tracking errors, which arise when aggregated local devices fail to deliver the expected amount of responsive load service. Each load controller (10) monitors the operating frequency of the grid network (8) and is adapted to adjust power consumption of one or more of its electrical loads (6) in response to excursions of the operating network frequency from its nominal value. The load controllers (10) are in communication with a remote controller (14) and aggregated together to provide a responsive load service. The remote controller (14) is adapted to monitor the deviation of grid frequency from its nominal value and to determine adjustments to the responsive load service delivered by the electrical loads of each load controller. The remote controller (14) thereafter sends a correction signal to each load controller (10), which causes the respective load controller (10) to apply a correction to its responsive load service by way of an offset to its power consumption adjustments.

18 Claims, 5 Drawing Sheets

(56) References Cited

U.S. PATENT DOCUMENTS

| | | |
|---|---|---|
| 8,996,628 B2 | 3/2015 | Bishel |
| 9,779,461 B2 | 10/2017 | Forbes, Jr. |
| 2006/0229768 A1* | 10/2006 | Chassin .................... H02J 3/14 |
| | | 700/286 |
| 2009/0216387 A1 | 8/2009 | Klein |
| 2014/0336835 A1 | 11/2014 | Bloor et al. |
| 2015/0039149 A1 | 2/2015 | Forbes, Jr. |
| 2015/0112501 A1 | 4/2015 | Rombouts et al. |
| 2017/0244252 A1 | 8/2017 | Nakayama et al. |
| 2017/0324246 A1 | 11/2017 | Sato et al. |
| 2018/0301907 A1 | 10/2018 | Iravani et al. |
| 2020/0328612 A1 | 10/2020 | Coleman et al. |

FOREIGN PATENT DOCUMENTS

| | | |
|---|---|---|
| GB | 2426878 A | 12/2006 |
| GB | 2472280 A | 2/2011 |
| GB | 2482426 A | 2/2012 |
| GB | 2493456 A | 2/2013 |
| JP | 2011019380 A | 1/2011 |
| WO | 2012114113 A2 | 8/2012 |

\* cited by examiner

SYSTEM AND METHOD FOR CONTROLLING AN ELECTRICAL LOAD

FIELD OF THE INVENTION

The present invention relates to a responsive load system adapted to control the operation of electrical loads coupled to an electrical power distribution network in the provision of a responsive load service. The present invention further relates to a load controller and a system controller adapted for use in the responsive load system. The present invention also relates to a method of controlling electrical loads connected to an electrical power distribution network in the provision of a responsive load service.

BACKGROUND OF THE INVENTION

An electrical power supply system includes at least one power generator and an electrical power distribution network which couples the one or more power generator to one or more electrical loads for the supply of electrical power to the electrical loads. Power output from the one or more power generators can temporally fluctuate from a nominal power level and the instantaneous or transitory power demands of the one or more electrical loads connected to the electrical power distribution network can also vary with respect to time. Moreover, such fluctuations in the amount of power supplied to the electrical power distribution network may be exacerbated by power generated and supplied to the electrical power distribution network by a renewable energy source such as, but not limited to, generators powered by solar energy and wind turbines. The supply of power from renewable energy sources is often intermittent because, for example, a renewable energy source may be dependent upon meteorological conditions. Irrespective of what causes a fluctuation in the power supply such fluctuations can cause and/or alter imbalances between the power generated and the power consumed across an electrical power distribution network. These dynamic imbalances can result in problems ranging from, inefficient power transmission and unpredictable local fluctuations in electricity supply to more severe effects such as blackouts across an electrical power distribution network.

Any imbalances between power generation and power consumed by loads across an electricity supply network as described above are substantially proportional to the deviation of an operational characteristic of the electricity supply network from a nominal value such as, but not limited to, instantaneous (present) network frequency. For example, the nominal value for the alternating frequency of electricity supply networks in the United Kingdom is 50 Hz. Imbalances in supply and demand across a UK electricity supply network result in the present network frequency being greater or lower than the nominal frequency of 50 Hz.

To manage temporary imbalances across an electricity supply network responsive load systems have been developed which control the present power demand of at least some of the electrical loads connected to the electricity supply network. Known responsive load services may be managed by a centralised control system that monitors the condition of an electricity supply network and responds to detected imbalances across the network by causing individual electrical loads or groups of electrical loads which are coupled to the network to adjust their power consumption.

Such a responsive load system is described in U.S. Pat. No. 5,576,700, which describes a load management system that includes a controller for overriding normal power consumption of an electrical load connected to an electrical power distribution network to adjust power consumption when the load. The power consumption of the electrical load is adjusted according to command signals transmitted by a centralised control system located remotely from the electrical load. Another such centralised control responsive load system is described in WO 2013/088229. With the system described in WO 2013/088229 a remote centralised control system selects loads connected to the power supply network for power consumption adjustment based on a comprehensive model of the power requirements and operational constraints of all of the loads capable of contributing to the responsive load service.

For known load management systems employing centralised control, such as those described in U.S. Pat. No. 5,576,700 and WO 2013/088229, there is an unavoidable time delay between the initial transmission of a command signal by the centralised control system and an electrical load altering its power consumption in response to that command signal. The time delay is unavoidable because of the inherent latency of whichever communication system is employed. This unavoidable time delay means that responsive load systems that use a centrally broadcasted command signal are not always able to alter the power consumption of electrical loads fast enough to compensate for quickly fluctuating imbalances across an electrical power distribution network.

An alternate known responsive load system delivers a responsive load service using autonomous control devices locally integrated with electrical loads connected to an electrical power distribution network. Such autonomous control devices are capable of operating independently of external control to deliver a responsive load service. The autonomous control devices monitor a physical parameter of the electrical power distribution network that varies in response to imbalances across the electrical distribution network such as, but not limited to, network frequency. When an autonomous control device detects an imbalance it alters the power consumed by the electrical loads with which it is integrated to reduce the detected imbalance across the network.

Known autonomous control devices are described in GB 2361118 and in GB 2426878. The autonomous control devices described in these patents monitor variations in the alternating electrical supply frequency of an electrical power distribution network from a nominal value. The autonomous control devices are connected to and control a population of electrical loads each of which has an energy storage capacity that varies with respect to the load's duty cycle. The energy storage capacity of the electrical load enables occasional adjustment of the load's energy consumption without significantly compromising the operational performance of the electrical load. For each electrical load, energy storage capacity thresholds govern when an electrical load is available to contribute to the response load service. When an electrical load with which the autonomous control device is connected is available to contribute to the responsive load service and an autonomous control device coupled to the available electrical load detects a frequency excursion of the network frequency from the nominal value (indicating an imbalance across the network), the autonomous control device causes the electrical load to alter the amount of electrical power it is drawing and/or is scheduled to draw from the power distribution network, depending upon what is needed to reduce the detected imbalance across the electrical distribution network.

An aggregated response of many individual electrical loads contributes to balancing supply and demand across the electrical power distribution network, and so normally only a sub-group of all potential electrical loads is used to respond to a detected imbalance across the power supply network. Selection of the electrical loads to deliver a responsive load service in response to a detected imbalance of the network is performed through the use of frequency triggering thresholds assigned by the autonomous control device to each of its one or more electrical loads with different frequency triggering thresholds being assigned by the autonomous control devices to individual electrical loads.

The fact that the autonomous control devices disclosed in GB 2361118 and GB 2426878 are integrated with the electrical loads means that any delay in responding to detected imbalances across the electrical power distribution network is minimised. As a result, responsive load systems that use autonomous control devices are, in general, better able to respond quickly to detected imbalances across an electrical power distribution network in comparison to those systems that use a centralised control system.

However responsive load systems which employ autonomous control devices are known to be susceptible to tracking errors. Such tracking errors involve the aggregate responsive load service provided by one or more autonomous control devices failing to deliver the expected amount of responsive load service. Tracking errors can result from a number of different sources such as, but not limited to, inaccuracy of the frequency monitors used by the autonomous control devices; under-performance of some of the autonomous control devices' electrical loads; and randomised frequency following in the triggering thresholds allocated to individual electrical loads etc. However, tracking errors can have severe consequences for the stability of an electricity supply system if autonomous control devices cause electrical loads to over or under compensate for detected imbalances across the electrical power distribution network. In addition, an unreliable or inconsistent responsive load service undermines the ability of the responsive load service to accurately quantify the amount of responsive load service provided.

SUMMARY OF THE INVENTION

Accordingly, there is a need to respond to tracking errors that arise in delivery of a responsive load service using autonomous control devices. Thus it is an object of the present invention to provide a responsive load system and a responsive load method adapted to identify and respond to under- or over-performance in the delivery of a responsive load service.

According to a first aspect of the invention, there is provided a responsive load system for delivering a responsive load service to an electricity power supply network having a nominal operating value for a variable physical parameter of the electricity supply network, the responsive load system comprising: a remote controller and at least one load controller adapted to control electricity consumption of one or more associated electrical loads in the vicinity of the load controller, each load controller including: a parameter measuring device for regular measurement of the variable physical parameter of the electricity supply network, a power consumption controller for determining and for causing adjustment of the power consumption of at least one of the one or more associated electrical loads to deliver a responsive load service in response to a detected difference between a recent measurement of the transitory variable physical parameter of the electricity supply network and the nominal operating value of the physical parameter, and a first communication device adapted for receiving command signals from the remote controller, each command signal being representative of an adjustment to the amount of responsive load service being delivered by the one or more associated electrical loads, the remote controller including: a parameter measuring device for regular measurement of the variable physical parameter of the electricity power supply network, an analyser adapted to determine adjustments to the responsive load service delivered by the one or more electrical loads of the at least one load controller; and a second communication device for transmitting to the at least one load controller a command signal representative of a determined responsive load service correction, wherein each load controller is adapted to receive the command signal and apply the responsive load service correction as an offset to power consumption adjustments determined by the power consumption controller.

Preferably the offset is applied by the load controller to: (i) measurements of the variable physical parameter of the electricity supply network, (ii) a threshold of the measured physical parameter which triggers adjustment of the power consumption of at least one of the one or more associated electrical loads to deliver a responsive load service, or (iii) a magnitude of the adjustment of the power consumption of at least one of the one or more associated electrical loads.

In a preferred embodiment each load controller is adapted to apply a responsive load service correction as an offset to all power consumption adjustments until a new responsive load service correction is transmitted by the remote controller. The remote controller may be adapted to transmit a responsive load service correction with a zero value where no correction is required.

Alternatively each load controller is adapted to apply a responsive load service correction as an offset to all power consumption adjustments for a predetermined period of time. The predetermined period of time may be at least 5 minutes, more preferably 30 minutes.

The load controller may be adapted to implement all responsive load service corrections immediately on receipt. Alternatively the load controller may be adapted to store one or more responsive load service corrections each in association with a respective execution time identifying a future time when the associated responsive load service correction is to be implemented by the load controller. Furthermore, the load controller may be adapted to update or change the execution time associated with a stored responsive load service correction.

In a particularly preferred embodiment the variable physical parameter of the electricity supply network is the operating frequency and the parameter measuring devices are frequency monitors.

Ideally the load controller includes wired connections to the one or more associated electrical loads. The first and second communications systems may be in wireless communication.

In a further aspect the present invention provides a load controller for delivering a responsive load service to an electricity power supply network having a nominal operating value for a physical parameter of the electricity supply network, the load controller comprising: a parameter measuring device for regular measurement of the variable physical parameter of the electricity supply network, a power consumption controller for determining and for causing adjustment of the power consumption of at least one of one or more associated electrical loads to deliver a responsive load service in response to a detected difference between a recent measurement of the transitory variable physical parameter of the electricity supply network and the nominal operating value of the physical parameter, and a communication device adapted for receiving command signals from a remote controller, each command signal being representative of a responsive load service correction, wherein the load controller is adapted to receive a command signal and apply the responsive load service correction as an offset to power consumption adjustments determined by the power consumption controller.

Preferably the offset is applied by the load controller to: (i) measurements of the variable physical parameter of the electricity supply network, (ii) a threshold of the measured physical parameter which triggers adjustment of the power consumption of at least one of the one or more associated electrical loads to deliver a responsive load service, or (iii) a magnitude of the adjustment of the power consumption of at least one of the one or more associated electrical loads.

Each load controller is preferably adapted to apply a responsive load service correction as an offset to all power consumption adjustments until a new responsive load service correction is transmitted by the remote controller.

The load controller may be adapted to apply a responsive load service correction as an offset to all power consumption adjustments for a predetermined period of time in which the predetermined period of time is at least 5 minutes, more preferably 30 minutes.

The load controller may be adapted to implement all responsive load service corrections immediately on receipt. Alternatively the load controller may be adapted to store one or more responsive load service corrections each in association with a respective execution time identifying a future time when the associated responsive load service correction is to be implemented. Furthermore, the load controller may be adapted to update or change the execution time associated with a stored responsive load service correction.

In a further aspect the present invention provides a remote controller for adjusting a responsive load service delivered by one or more electrical loads under the control of at least one load controller to an electricity power supply network having a nominal operating value for a variable physical parameter of the electricity supply network, the remote controller comprising: a parameter measuring device for regular measurement of the variable physical parameter of the electricity power supply network, an analyser adapted to determine adjustments to a responsive load service being delivered by one or more electrical loads under the control of the at least one load controller; and a communication device for transmitting command signals each representative of a determined responsive load service correction to the at least one load controller, wherein the determined responsive load service correction is adapted to be applied as an offset by the at least one load controller to power consumption adjustments determined by the at least one load controller.

Preferably the remote controller is further adapted to transmit a responsive load service correction with a zero value where no correction is required.

In a still further aspect the present invention provides a method of controlling one or more electrical loads coupled to an electricity power supply network having a nominal operating value for a variable physical parameter of the electricity power supply network to deliver a responsive load service by varying the power consumption of the one or more electrical loads in response to a difference between an instantaneous measurement of the variable physical parameter of the electricity power supply network and its nominal operating value, said method comprising the steps of:

(i) regular measurement of the variable physical parameter of the electricity power supply network by a load controller in the vicinity of and in communication with the one or more electrical loads and separately by a remote controller;

(ii) in response to a difference detected by the load controller between a measured instantaneous value of the variable physical parameter and the nominal operating value, determining a power consumption adjustment and adjusting the power consumption of at least one of the one or more electrical loads in accordance with the determined power consumption adjustment to deliver a responsive load service independently of the remote controller;

(iii) the remote controller determining a responsive load service correction to the responsive load service being delivered;

(iv) transmitting a command signal representative of the determined responsive load service correction from the remote controller to the load controller; and the load controller altering the responsive load service delivered to the electricity power supply network in accordance with the determined responsive load service correction transmitted to the load controller wherein the determined adjustment is an offset to be applied by the load controller to power consumption adjustments determined by the load controller.

The responsive load service delivered to the electricity power supply network may be altered by the load controller immediately upon receipt of a responsive load service correction. Alternatively the method includes the step of the load controller storing one or more responsive load service corrections each in association with a respective execution time identifying a future time when the associated responsive load service correction is to be implemented. With this alternative embodiment the method may also include the load controller updating or changing the execution time associated with a stored responsive load service correction.

Preferably the method further comprises the steps of:

(v) the load controller transmitting to the remote controller service data on the magnitude of the responsive load service provided by the one or more electrical loads;

(vi) analysis of the service data transmitted by the load controller to identify tracking errors in the magnitude of the responsive load service provided; and (vii) determining and transmitting a responsive load service correction based upon an identified tracking error.

Thus, with the present invention a responsive load system and method is provided which avoids the inherent delays of a centralised control responsive load system and so ensures a very quick response to any deviations from a nominal value of a monitored characteristic of an electricity supply network whilst reducing the impact on the electricity supply network of any tracking errors that arise during operation.

BRIEF DESCRIPTION OF THE DRAWINGS

These and other aspects of the invention will now be described, by way of example only, with reference to the accompanying figures, in which.

DETAILED DESCRIPTION OF PREFERRED EMBODIMENTS

Figure 1:
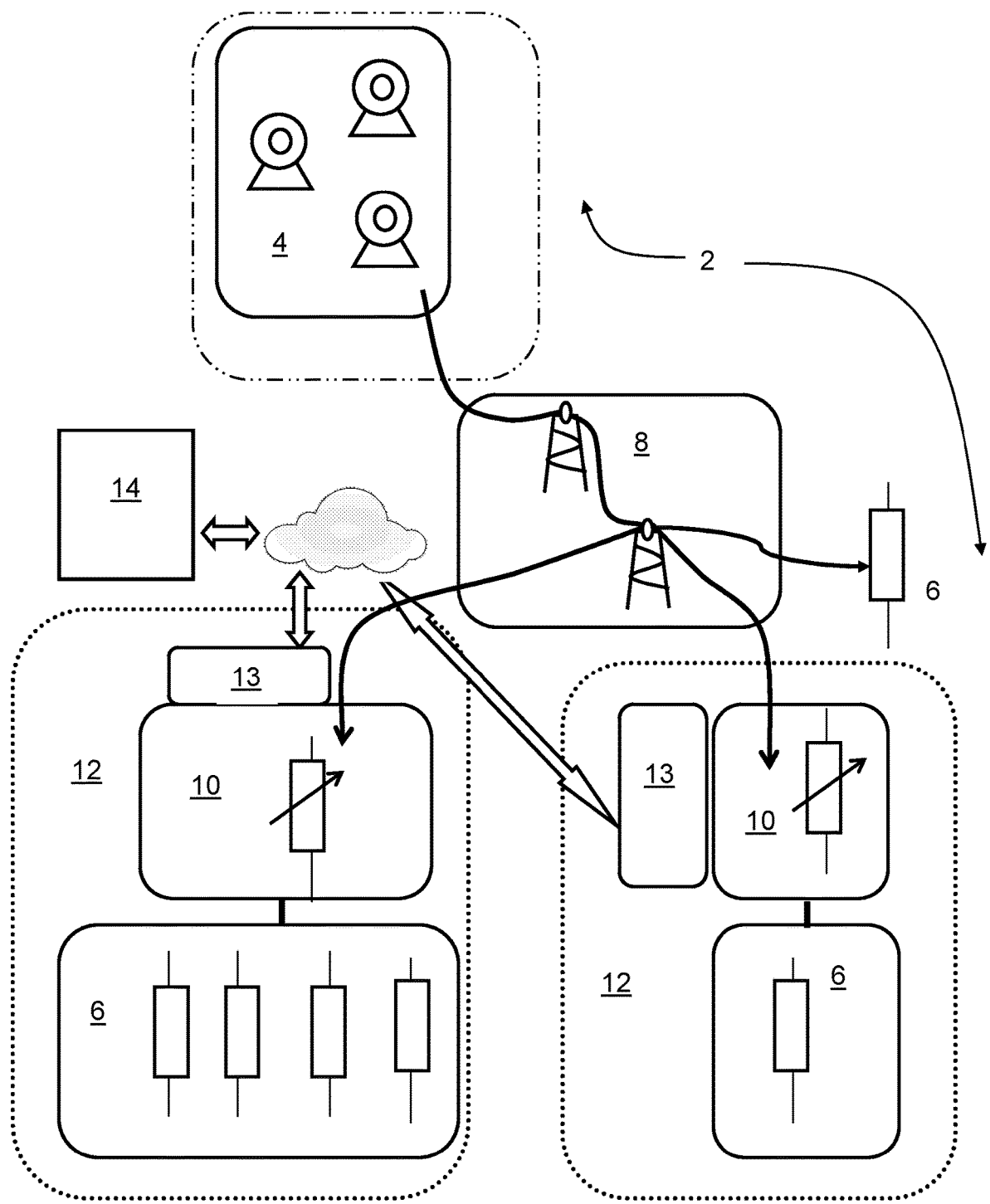
FIG. 1 shows an electricity supply system suitable for use with the present invention.

An electrical power supply system indicated generally by 2 is illustrated in FIG. 1. The electrical power supply system 2 comprises one or more power generators 4 and a plurality of electrical loads 6. The power generators 4 supply electrical energy to the electrical loads 6 via an electrical power distribution network 8 (hereinafter "the network 8"). At least some of the electrical loads 6 are connected to and in communication with semi-autonomous load controllers 10. The semi-autonomous load controllers 10 are adapted to control the amount of electrical energy drawn by the electrical loads 6 from the network 8. Preferably, the semi-autonomous load controller 10 is physically close to and, optionally, integrated into the one or more electrical loads 6 with which the load controller 10 is connected so as to minimise communication latency between the load controller 10 and its respective one or more electrical loads 6. Ideally, the communication latency between the load controller 10 and its respective one or more electrical loads 6 is less than 3 seconds and more preferably less than 1 second. A load controller 10 may be adapted to control the amount of electrical energy drawn by a single electrical load 6 or a single load controller 10 may be adapted to control the amount of electrical energy drawn by a plurality of electrical loads 6. Where a plurality of electrical loads 6 are collectively controlled as a group by a single load controller 10, electrical load members of the group may be selected as part of a sub-group according to, for example, a common end user of the electrical loads 6 and/or similar electrical energy requirements, such as but not limited to similar duty cycles and/or differing but complementary electrical energy requirements.

Reference herein to a responsive load device 12 is to be understood as reference to the combination of one or more electrical loads 6 and a semi-autonomous load controller 10 which activates, deactivates, or adjusts the consumption of electrical energy from the network 8 by the one or more electrical loads 6 in the delivery of a responsive load service.

The load controller 10 is adapted to monitor the performance of its associated one or more electrical loads 6 in the provision of a responsive load service and is adapted to receive data from its respective one or more electrical loads 6 relating to present power consumption by the electrical load(s) as well as other data relating to the transient (instantaneous) capacity of the electrical load(s) 6 to provide or to continue to provide a responsive load service. With presently available technology communication between the load controller 10 and its respective one or more electrical loads 6 is preferably by means of wired transmission (to minimise communication latency) but alternative communication methods are also envisaged including wireless transmission, such as but not limited to, Bluetooth or equivalent short-range Wi-Fi. Within the responsive load system, ideally a time delay of less than 5 seconds exists between at least some of the load controllers 10 issuing a demand for an electrical load 6 to provide a responsive load service and at least some of the electrical loads 6 adjusting the amount of power the loads draw from the network 8. More preferably a time delay of 2 seconds or less exists between some of the loads and their associated controller. The above does not, though, exclude at least some of the loads in the responsive load system being much slower than 5 seconds to respond. Indeed it is envisaged that slower responding loads can be particularly beneficial when used in combination with short duration but quickly responding loads.

The load controller 10 may be adapted to determine, from data the load controller 10 holds regarding the characteristics and operational performance of the one or more electrical loads 6 with which it is connected, the present energy storage capacity (also referred to herein as instantaneous energy storage capacity) of its respective one or more electrical loads 6 and therefore the present capacity (instantaneous capacity) of the one or more electrical loads 6 to provide responsive load service.

Figure 2:
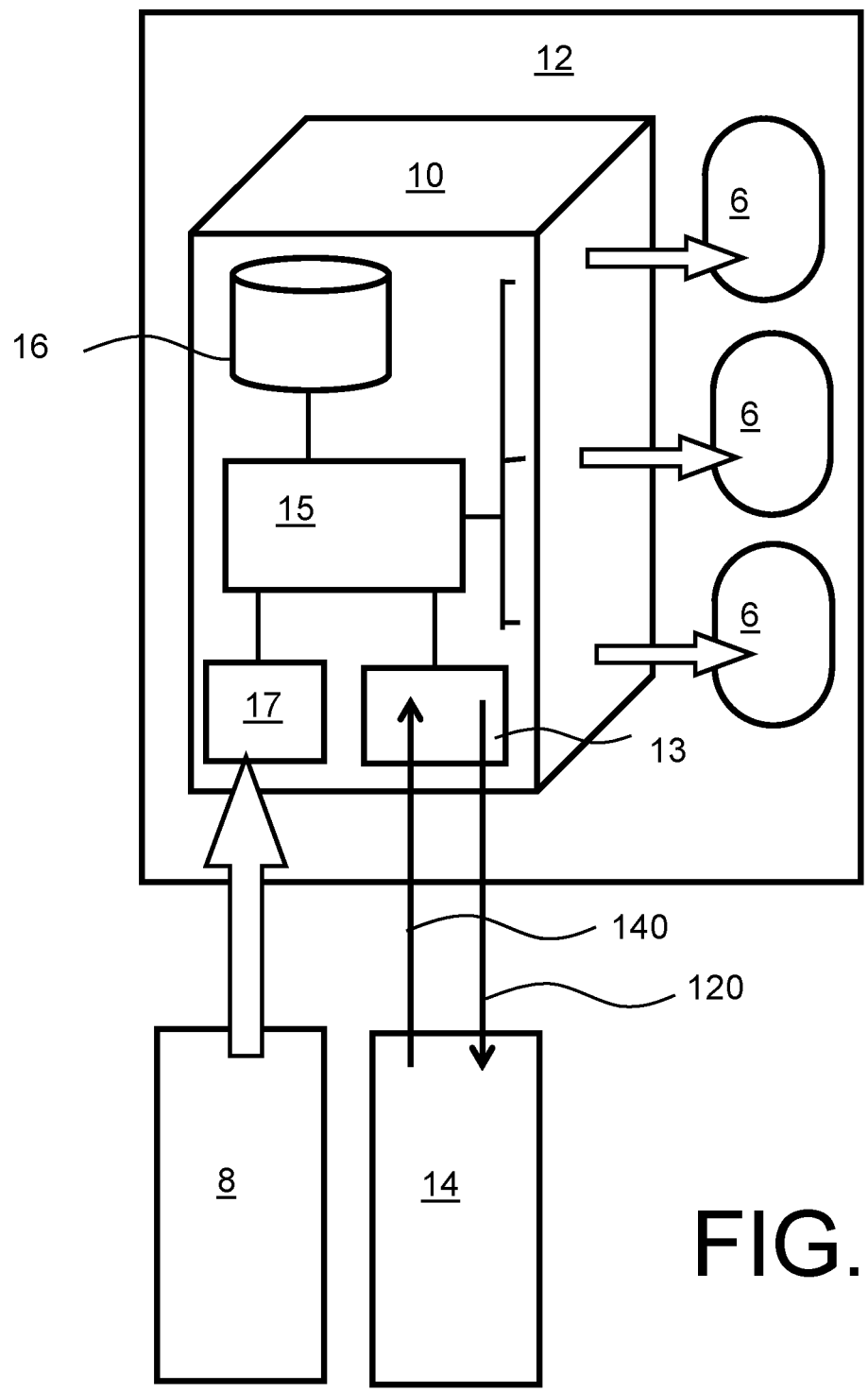
FIG. 2 illustrates schematically a responsive load device of a responsive load system in accordance with the present invention; and, FIG. 3 illustrates schematically a central controller of a responsive load system in accordance with the present invention.

The semi-autonomous load controller 10 is illustrated in greater detail in FIG. 2. The semi-autonomous load controller 10 includes many of the features of a conventional load controller as described in GB 2361118 and GB 2426878, the contents of which are incorporated herein by reference. A detailed description of those features and functionality common to the load controllers described in GB 2361118 and GB 2426878 is not, therefore, provided herein. The semi-autonomous load controller 10 includes one or more processors 15 for performing the program steps necessary to deliver a responsive load service. The one or more processors 15 are in communication with one or more memories 16 which constitute program and data storage (optionally including electrical load characteristics and performance data). The memories 6 are conventional memory components such as, but not limited to, conventional RAM and/or flash ROM. The one or more processors 15 are also in communication with a frequency monitor 17 which is adapted to detect fluctuations in the nominal alternating frequency of the electrical power supplied over the network 8. Monitoring transitory fluctuations in frequency is the currently preferred approach to detecting imbalances in the power supply across the network 8 but alternative monitors 17 adapted to detect fluctuations in other characteristics of the electricity supply network 8, which are representative of imbalances in the power supplied across the network 8, are envisaged and may be substituted for the frequency monitor described herein.

The responsive load service provided by the responsive load devices 12 involves, in essence, altering the amount of electrical power drawn from the network 8 so as to reduce the imbalance between power supplied to the network and power being drawn from the network 8. As mentioned earlier, an imbalance between the power supplied to the network and the power drawn from the supply network 8 is proportional to the extent of the deviation or excursion of the present (instantaneous) operating alternating frequency of the network 8 from the nominal operating alternating frequency of the network 8. A decrease in the operating frequency below that of the nominal value indicates that the power generated by the power generators 4 is less than the power required to meet the present power demands across the network 8. Therefore, in response, the responsive load device 12 is adapted to provide a "low-frequency" response to reduce or stop the power consumption of one or more of its electrical loads 6. Conversely, an increase in the present operating frequency in excess of the nominal value indicates that the power generated by the power generators 4 is in excess of the power required to meet present power demands across the network 8. In this situation the responsive load device 12 is adapted to provide a "high-frequency" response to increase or prolong the power consumption of one or more of its electrical loads 6. The load controller 10 of the responsive load device 12 therefore includes the functionality of a power consumption controller which is programmed and thus adapted to ensure the electrical loads 6 of the responsive load device 12 perform the functions described above and thereby contribute to reducing an operating frequency excursion from the nominal value of the network 8.

The extent or amount of the required change in the power consumption of one or more electrical loads 6 is determined by the one or more processors 15 of the load controller 10 as a function of the magnitude by which the monitored present frequency of the network 8 has deviated from its nominal value. In one embodiment of the load controller 10, the load controller 10 is programmed to continuously vary the power consumption of its associated electrical load(s) 6 in response to any detected deviation of the network operating frequency from the nominal value. In a preferred alternative embodiment of the load controller 10, the load controller 10 is programmed to vary the power consumption of at least one or more of its respective one or more electrical loads 6 only after one or more operating frequency thresholds have been exceeded. With this preferred embodiment each of the operating frequency thresholds corresponds to a minimum deviation of the monitored operating frequency from the nominal value which is used to trigger responsive load service by one or more of the electrical loads 6.

A frequency threshold (also referred to herein as a triggering threshold) may be allocated to one or more electrical loads 6 by the load controller 10 randomly or quasi-randomly within a range of frequencies encompassing expected deviations in the operating frequency from the nominal value. For example in the UK frequency ranges for operating frequency thresholds may be between 49.5 Hz and 50.0 Hz and between 50.0 Hz and 50.5 Hz. Other frequency ranges are, though, also envisaged. Using the frequency ranges described above, one or more electrical loads 6 could be allocated a low-frequency triggering threshold of, for example, 49.60 Hz and/or a high-frequency triggering threshold of, for example, 50.35 Hz. Within a population of responsive load devices 12, different triggering thresholds or ranges of thresholds are allocated to different responsive load devices 12 in order to diversify the response of the responsive load overall responsive load system to imbalances between the power generated and the power consumed across the network 8.

Once a triggering threshold has been allocated to one or more electrical loads 6 by the load controller 10, the triggering threshold is changed or altered by the load controller 10 either autonomously or in response to instructions the load controller 10 receives from a remote controller 14 otherwise referred to herein as a central controller 14. The timing of autonomous adjustment of the triggering threshold by the load controller 10 may be pre-programmed or may be triggered by an event. For example the operating frequency threshold for an electrical load may be changed by the load controller 10 automatically once a previously triggered delivery of responsive load service by the electrical load is completed. Autonomous adjustment of the triggering threshold by the load controller 10 may involve applying a predetermined mathematical function to the electrical load's existing frequency threshold or may involve reassignment of a triggering threshold randomly or quasi-randomly.

A responsive load device 12 will continue to provide a responsive load service, after being triggered as a result of the transitory operating frequency exceeding an electric load's operating frequency threshold, until either:
- the deviation in the operating frequency is reduced such that the triggering condition ends;
- a maximum trigger time for that particular responsive load device 12 or a particular electrical load 6 has been reached; or
- an electrical load 6 is at risk of exceeding its own operational constraints and is withdrawn from responsive load service.

Alternatively, or in combination with the frequency thresholds described above, the controller 10 is programmed to determine the amount of power demand (the amount of load) it controls as a percentage of the theoretic total power demand under its control. The percentage of total power demand is determined by the controller 10 in proportion to the magnitude of the operating frequency excursion. Thus +/−20% demand response is selected by the controller 10 where a frequency excursion of 50.1 Hz/49.9 Hz is detected whereas +/−100% power demand is selected by the controller 10 where the operating frequency is at the maximum acceptable frequency excursions of 49.5 Hz/50.5 Hz. Selection of the percentage of power demand to be delivered as part of the responsive load service may be determined autonomously by the load controller 10 or may be adjusted or overridden by instructions received from the central controller 14.

In contrast to conventional responsive load devices, the semi-autonomous load controller 10 described herein additionally includes a communications interface 13 for receiving command signals 140 from a remote central controller 14. Optionally the communications interface 13 is adapted for bi-directional communication and the transmission of data from the load controller 10 to the remote central controller 14. The load controller 10 may have its own communications interface 13, as illustrated in FIGS. 1 and 2, or a plurality of load controllers 10 may share a communication interface 13. Where the communications interface 13 is bi-directional, the load controllers 10 are adapted to transmit, via the communications interface 13, responsive load service data to the remote central controller 14 for recordal (storage) in, for example, one or more central servers of the central controller 14 and for subsequent analysis by the central controller 14. The command signals from the central controller 14 and the responsive load service data from the responsive load device 12 are communicated using the same or different communication media or networks appropriate for transmission between remote locations. Such communication media and networks include, but are not limited to, wired and wireless transmission, optical fibre transmission, land and satellite telephony, the Internet and so forth. Ideally, all communications between a responsive load device 12 and the remote central controller 14 are secured, for example using a virtual private network (VPN) and other such security features. As the central controller 14 is remote from the responsive load devices 12, a delay of upwards of 10 seconds may exist between a command signal being issued by the central controller 14 and the same command signal being received and acted upon by a responsive load device 12.

As mentioned earlier, the load controller 10 is adapted to receive instructions in the form of a command signal from the central controller 14 to adjust the how much electrical energy is drawn by the electrical loads 6 under its control as part of a responsive load service. The command signal transmitted by the central controller 14 to the load controller 10 is preferably in the form of an offset which may be applied:

i) in the form of a frequency offset which increases or reduces the operating frequency thresholds allocated to individual loads 6 so that the aggregate amount of responsive load service is increased or reduced by an amount determined by the central controller 14, or ii) in the form of a frequency offset which increases or reduces the operating frequency measurement values recorded by the frequency monitor 17 of the load controller 1 so that the aggregate amount of responsive load service is increased or reduced by an amount determined by the central controller 14; or iii) in the form of a response offset which increases or reduces the percentage of the theoretic total power demand selected autonomously by the local controller 10 in response to the magnitude of a detected frequency excursion so that the aggregate amount of responsive load service is increased or reduced by an amount determined by the central controller 14.

With option i) the load controller 10 updates the trigger thresholds for each of its respective electrical loads 6 by applying to the original threshold frequency $f_{Threshold}$ a frequency amount $+/-f_{CentralSignal}$ contained in the command signal received from the central controller 14. Thus the original threshold frequency $f_{Threshold}$ is adjusted to:

$$f_{AdjustedThreshold} = X(f_{Threshold}) + (+/-f_{CentralSignal}).$$

With option ii) the load controller 10 adjusts the value of all operating frequency measurements generated by the frequency monitor 13 by an amount corresponding to the frequency amount $+/-f_{CentralSignal}$ contained in the command signal from the central controller 14. Thus the measured operating frequency f is adjusted to:

$$f_{Adjusted} = f + (+/-f_{CentralSignal}).$$

With option iii) the load controller 10 adjusts the amount of the response $\%_{Response}$ selected autonomously by the load controller 10 by an amount corresponding to the offset amount $+/-\%_{CentralSignal}$ contained in the command signal from the central controller 14. Thus the response is adjusted to:

$$\%_{AdjustedResponse} = \%_{Response} + (+/-\%_{CentralSignal}).$$

In the examples given above the offset amount has a magnitude predetermined by the remote controller which is applied as a simple additive term. Alternatively, the magnitude of the offset amount may include a multiplicative term associated with the magnitude of the frequency excursion from the nominal frequency $f_{nominal}$ as detected independently by each load controller. For example, the offset amount may be applied as follows:

IF $f > f_{nominal}$ (e.g. 50.0 Hz) THEN:

$$f_{Adjusted} = f_{nominal} + (f - f_{nominal}) * CS_{MultiplyHigh} + f_{CentralSignal}$$

ELSE:

$$f_{Adjusted} = f_{nominal} + (f - f_{nominal}) * CS_{MultiplyLow} + f_{CentralSignal}$$

$CS_{MultiplyHigh}$ and $CS_{MultiplyLow}$ are multiplicative central signal terms predetermined by the remote controller and communicated as part of the command signal from the remote controller to the individual load controllers. Alternatively each of the load controllers may have the multiplicative central signals and/or $f_{CentralSignal}$ stored locally in memory.

With this alternative approach, the magnitude of the responsive load service correction is partially determined by the detected magnitude of a network frequency excursion. Furthermore, it is possible for $CS_{MultiplyHigh}$ and $CS_{MultiplyLow}$ to have different magnitudes. This enables the load controller to provide a response to high frequency excursions which is different to its response to low frequency excursions and in so doing accommodate differences in network inertia with respect to high frequency excursions and low frequency excursions.

Although the above example involving the use of a multiplicative central signal term is specific to applying a frequency offset to frequencies measured by the load controller (option ii), it will be immediately apparent that a multiplicative central signal term may also be used in a similar manner in calculating offsets for options (i) and (iii).

In the above examples $f_{CentralSignal}$ and $\%_{CentralSignal}$ are an offset which may take a positive or negative value depending upon whether an upward or downward adjustment is required. Also, the default value for $f_{CentralSignal}$ and $\%_{CentralSignal}$ may be set to 0 and the default value for $CS_{MultiplyHigh}$ and $CS_{MultiplyLow}$ may be set to 1 to enable the local controller 10 to apply a single calculation whenever a new threshold frequency is determined, a new operating frequency measurement is recorded or the magnitude of the responsive load service to be delivered is determined, whilst ensuring that the threshold frequency, the measured operating frequency or the magnitude of the responsive load service to be delivered is only adjusted when a non-zero value for $f_{CentralSignal}$ or $\%_{CentralSignal}$ is communicated by the central controller 14 to the responsive load device 12.

In one embodiment the central controller 14 is adapted to issue command signals at regularly spaced intervals with each new command signal overwriting the previous command signal. In an alternative embodiment, the load controller 10 includes a timer (not illustrated) which applies automatically a limit to the time duration of any non-zero offset received as a command signal from the central controller 14. For example a non-zero adjustment may be limited to a period of time of 30 minutes. It will, of course, be apparent that such fixed time durations during which a non-zero adjustment is applied may be more than 30 mins but may also be less than 30 minutes e.g. 15 minutes, 5 minutes or even less. This alternative embodiment reduces the requirement for regular communication with the central controller 14 and so is useful where the communication link between the central controller 14 and the load controller 10 is, for example, unreliable.

The load controller may be adapted to implement all responsive load service corrections immediately on receipt. Alternatively the load controller may include a memory in which is stored one or more responsive load service corrections each in association with an execution time which identifies a future time when the associated responsive load service correction is to be implemented. The responsive load service corrections may be pre-stored in the load controller or may be transmitted from the remote controller to the load controller for storage and future execution. This enables the remote controller to schedule responsive load service corrections for future execution where network frequency excursions are expected. Furthermore, where the memory of the load controller is a read/write memory, the load controller may be adapted to update or change the execution time associated with a stored responsive load service correction. This ability to adjust the execution time enables planned future responsive load services to be scheduled very precisely.

The amount by which the operating frequency threshold, the operating frequency measurement or the percentage response is increased or decreased may be consist of a natural value in the command signals transmitted by the central controller 14. Alternatively, the load controller 10 may have predetermined adjustment amounts stored in its memory 16, for example in a look-up table, each adjustment amount being associated with an adjustment code. With this alternative approach only the adjustment code is transmitted in the command signal to the responsive load devices 12 which enables the payload of the command signal to be minimised.

Command signals generated by the central controller 14 may be global i.e. the same command signal instructing the same adjustment is transmitted to all responsive load devices 12 in the responsive load system. However, in a particularly preferred embodiment command signals are generated by the central controller 14 for individual responsive load devices 12 or for a sub-group of responsive load devices 12. Command signals intended for only some and not all of the responsive load devices 12 in the responsive load system may be transmitted to each intended responsive load device recipient individually. However, in order to minimise command signal latency, command signals for only one or a sub-group of responsive load devices 12 are preferably broadcast to all responsive load devices 12 in the responsive load system with the command signal including responsive load device identifiers indicating which responsive load devices are to accept and act on the command signal.

Figure 3:
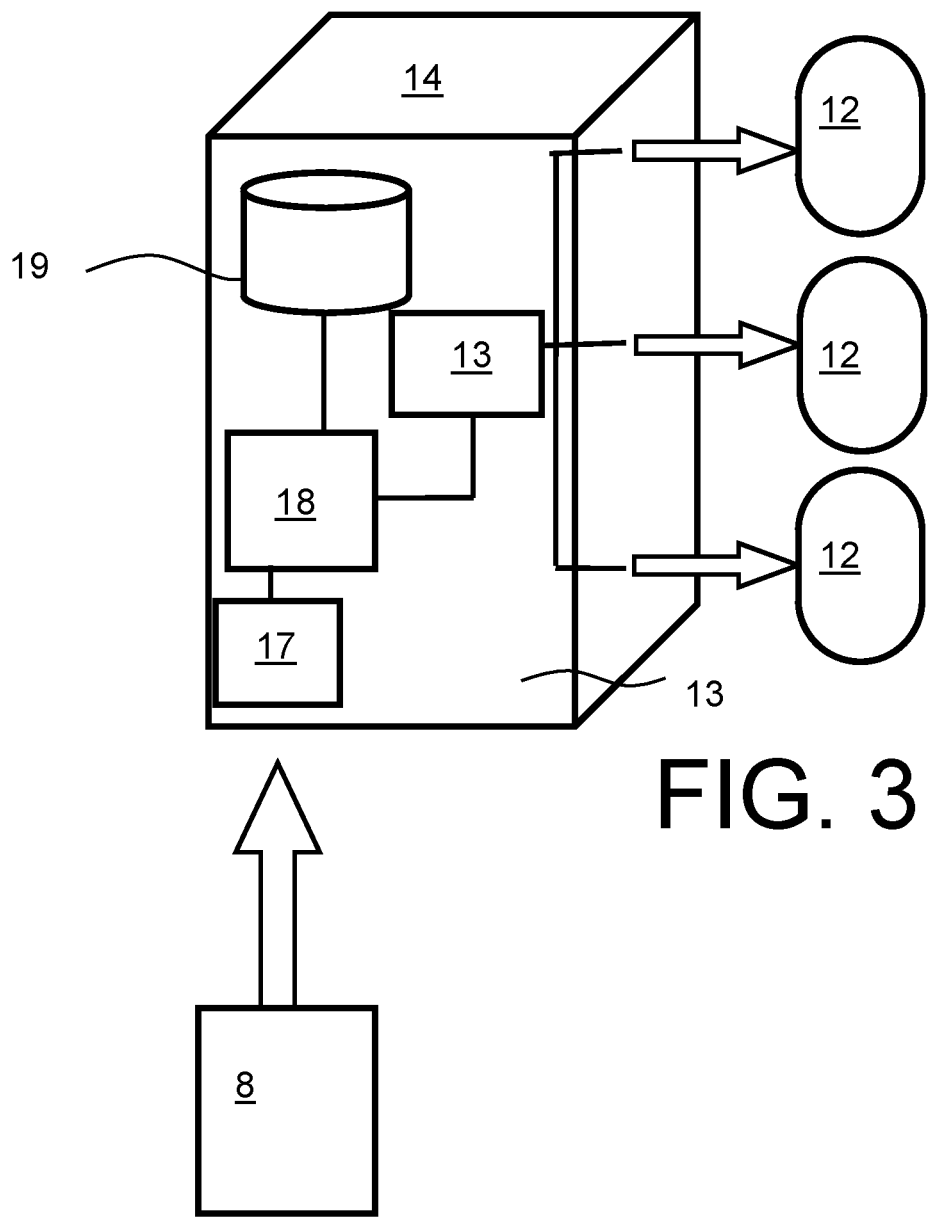

As illustrated in FIG. 3, the central controller 14 includes one or more processors 18 for performing the program steps necessary to implement centralised supervision and management of the responsive load system and delivery of the responsive load service. The one or more processors 18 are in communication with one or more memories 19 which constitute program and data storage. The one or more processors 18 are also in communication with a frequency monitor 17 which is adapted to detect fluctuations in the alternating operating frequency of the electrical power supplied over the network 8. Monitoring fluctuations in frequency is the current preferred approach for detecting imbalances in the power supply across the network 8 but it is envisaged that alternative monitors 17 adapted to detect fluctuations in other characteristics of the network 8 representative of imbalances in the power supplied across the network 8 may be substituted for the frequency monitor described herein.

The central controller 14 is programmed to analyse the monitored operating frequency of the network 8 and any responsive load data transmitted from the responsive load devices 12 to the central controller 14 and to determine automatically whether the amount of responsive load service presently being delivered should be increased or decreased by broadcasting a non-zero offset command signal. Where the central controller 14 is in two-way communication with the responsive load devices 12, the central controller 14 determines whether a non-zero offset is needed, by comparing the operating frequency data independently recorded by its own frequency monitor 17 with data received from the responsive load devices 12 regarding the magnitude of responsive load service delivered. Any divergence greater than a minimum permitted deviation between the fluctuations in the network operating frequency and the fluctuations in the magnitude of responsive load service delivered found in the comparison is identified as a tracking error and triggers transmission by the central controller 14 of a non-zero offset command signal to at least the responsive load devices 12 that produced the divergent responsive load service data.

Where only one-way communication exists between the central controller 14 and the responsive load devices 12, the central controller 14 uses a pre-programmed model of the responsive load devices 12 to generate a theoretical model of the responsive load service expected to be delivered by the responsive load devices 12 in response to the actual fluctuations of the network operating frequency and the impact of the theoretical responsive load service on the network operating frequency. The predicted impact on the network operating frequency is compared to the actual monitored network operating frequency and any divergence greater than a predetermined minimum permitted deviation which persists longer than a predetermined period of time triggers transmission by the central controller 14 of a non-zero offset command signal to some or all of the responsive load devices 12 under its control.

In addition, or in the alternative, transmission by the central controller 14 of a non-zero offset may be triggered where the central controller 14 receives or has information indicating the need for additional responsive load service from one or more of the responsive load devices 12 under its control. For example, the data on the responsive load devices 12 stored in the central controller's memories 16 may indicate that some of the responsive load devices 12 will be unavailable for a fixed period of time in the future. This requires other responsive load devices 12 within the responsive load system 2 to increase the magnitude of their responsive load service to account for the lack of responsive load service from the unavailable responsive load devices. On the basis of this information the central controller 14 may automatically transmit a non-zero offset during the time the responsive load devices 12 are known to be unavailable.

Consider a situation in which an upward excursion of the operating frequency of the network 8 triggers delivery of a responsive load service. The upward excursion is quickly halted and the central controller 14 subsequently detects a rapid descent in the monitored operating frequency suggestive of the present responsive load service being in excess of what is required. In response to this information the central controller 14 is programmed to transmit automatically command signals to a sub-group of responsive load devices requiring an offset to be applied to their measured operating frequencies, their triggering thresholds or their percentage response so as to reduce the contribution of or fully withdraw that sub-group of responsive load devices from responsive load service. The sub-group of responsive load devices to be withdrawn from responsive load service may be selected by the central controller 14 randomly or quasi-randomly or with reference to the operational characteristics of the electrical loads and/or responsive load devices subject to higher power charges.

Figure 4A:
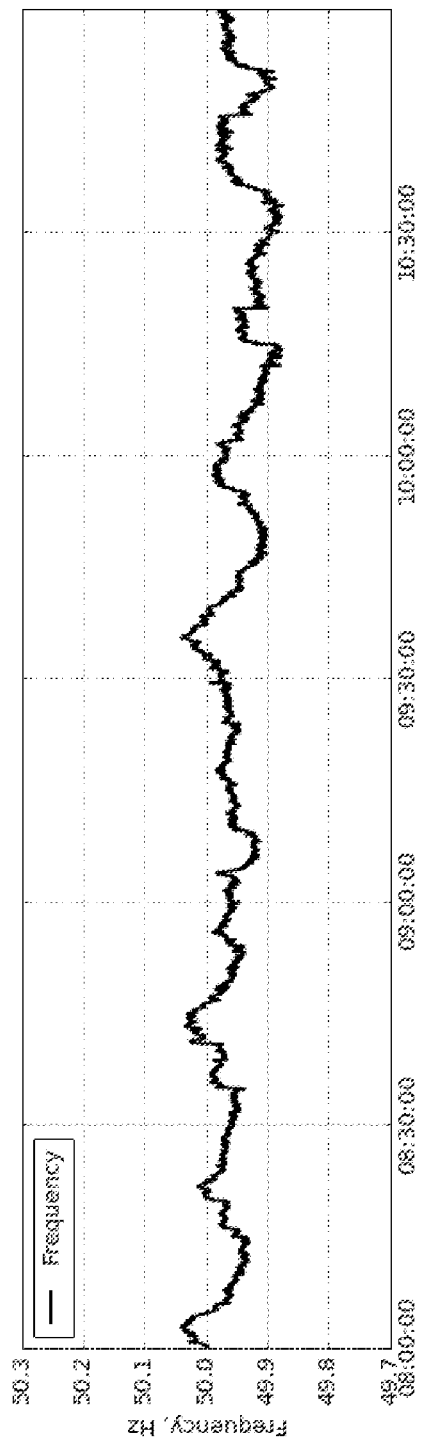
FIG. 4A is a graph of the operating frequency of a simulated electrical power distribution network over a three hour period with no responsive load service, illustrating random deviations of the network frequency from its nominal value.

To illustrate the methodology and functionality of the responsive load system 2 and method described above reference is made to FIGS. 4A-4C. The graph in FIG. 4A shows fluctuations of the operating frequency of an electricity supply network during a three hour window in the absence of responsive load intervention. The nominal frequency for the electricity supply network is 50 Hz but as is clear from FIG. 4A during the three hour period the actual operating frequency fluctuates between a minimum frequency of approx. 48.8 Hz and a maximum frequency of 50.05 Hz with the majority of the frequency excursions being low frequency excursions.

Figure 4B:
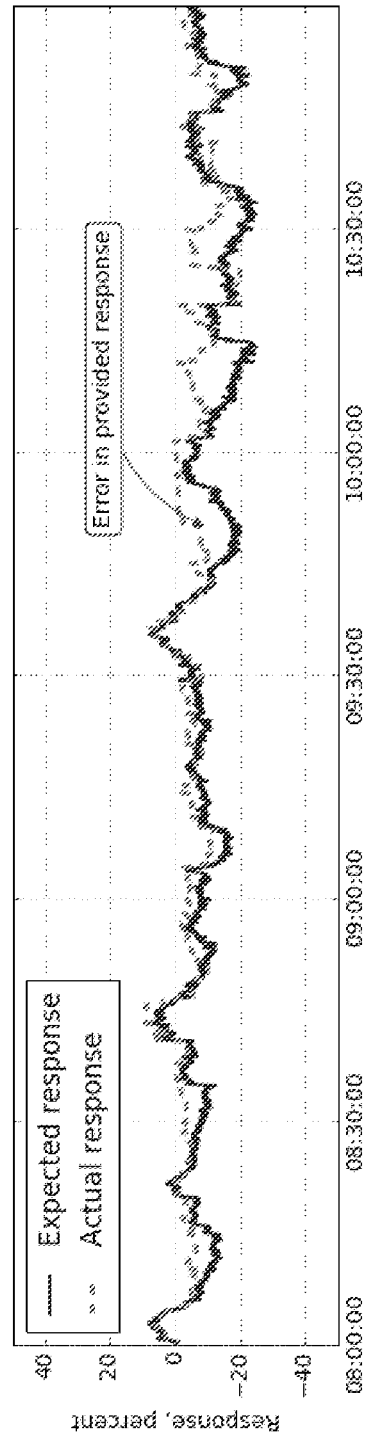
FIG. 4B is a graph covering the same three hour period showing an expected responsive load service and an actual responsive load service delivered by an autonomous responsive load device to the simulated frequency fluctuations of FIG. 4A.

Turning now to FIG. 4B, this graph illustrates a simulation of the expected (solid line) simulated response and the actual (broken line) simulated response to the fluctuating operating frequency illustrated in FIG. 4A of a responsive load system 2 using a group of 200 individual loads controlled by a wholly autonomous load controller. The group of 200 loads includes different types of load having different performance characteristics and different duty cycles and so the actual response represented by the broken line is an amalgamation of the responses of the individual loads.

As can be see between 9:30 am and 10:00 am the actual response (broken line) diverges from the expected response. This difference represents a tracking error in the response of the autonomous load controller of a responsive load system. Similar tracking errors occur between 10:00 am and 10:30 am and around 10:30 am. These tracking errors represent times when the responsive load service delivered by the wholly autonomous load controller over or under delivered a response in terms of a percentage change in the power demanded by the loads under the control of the load controller.

Figure 4C:
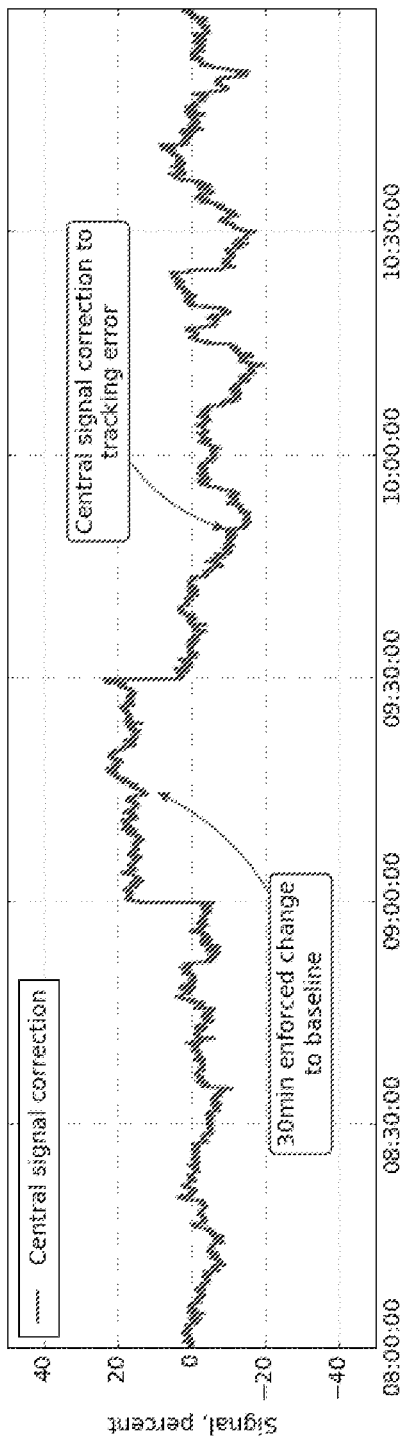
FIG. 4C is a graph covering the same three hour period showing a tracking error correction signal issued centrally to the autonomous responsive load device of FIG. 4B in accordance with the present invention.

Turning now to FIG. 4C, this is a graph of the simulated response to the fluctuating operating frequency illustrated in FIG. 4A of a responsive load system 2 in accordance with the present invention. Between 9:30 am and 10:00 am a correction by the central controller 14 of the tracking error of the semi-autonomous load controller 10 is indicated and similar tracking error corrections are evident through comparison of the load controllers' responses illustrated in FIGS. 4B and 4C.

In addition, FIG. 4C illustrates an enforced change to the baseline response delivered by the semi-autonomous load controller 14 for a period of time of 30 minutes between 9:00 am and 9:30 am which was enforced by means of a signal transmitted by the central controller 14. The central controller 14 transmitted the change to the baseline response to accommodate an anticipated reduction in power demand elsewhere on the network. In this way, the responsive load system 2 is capable of both responsive and proactive delivery of a responsive load service.

The central controller 14 may further include program instructions for the analysis of responsive load data supplied by individual responsive load devices 12. The responsive load data may be used to identify responsive load devices 12 that persistently fail to deliver as much responsive load service as expected, for example as a result of poorly performing electrical loads 6. Using this information the central controller 14 is also able to identify, for example based on their operational constraints, sub-groups of responsive load devices capable of delivering longer term responsive load service so as to minimising power status switching of individual electrical loads 6.

The responsive load system described herein provides a blend of local measured autonomous frequency response and centralised control. This enables management of the operational constraints of individual electrical loads to be separated from the network requirements in terms of delivery of a responsive load service. Moreover the responsive load system described herein is able to provide a high speed (≤2 s) response to detected operating frequency excursions through the use of semi-autonomous control devices in combination with enhanced responsive load service management by means of centralised adjustment of continued responsive load service. Thus an initial high speed autonomous responsive load service is delivered immediately an imbalance across the network is detected and the initial autonomous responsive load service is then fine-tuned through adjustments to the responsive load service determined by the central controller. Moreover the adjustments are determined relative to the initial responsive load service that is delivered because the adjustments are based on the operating frequency of the network monitored by the central controller after the initial responsive load service has been delivered to the network.

With the responsive load service and method described herein, centralized responsive load control is blended with local autonomous responsive load control in a manner that avoids local autonomous responsive load settings and operation conflicting with instructions issued by the remote centralized controller. This ensures the reliability and robustness of the responsive load system. Moreover, implementing centralized responsive load control through an offset applied to the local autonomous responsive load control minimises the time required to implement any centralised adjustment and minimises processing requirements in contrast to a responsive load service in which a load controller may be required to switch between different operational states namely autonomous operation and 'slave' operation where the load controller is wholly under the control of the remote controller.

In practice, the level or amount of a wholly autonomous responsive load service provided in response to detected imbalances across an electrical power distribution network may imperfectly meet the requirements for fully rebalancing the network in the form of tracking errors. The responsive load system described herein is adapted to detect and correct such tracking errors and thereby deliver an enhanced and highly reliable responsive load service whilst maintaining minimal latency in the initial delivery of the responsive load service. Furthermore, the responsive load system is adapted to store and analysis operational and performance data on the electrical loads used in delivery of the responsive load service enabling operating characteristics to be modelled in a parameterized manner. This maximises use of the electrical loads' potential to provide responsive load service.

Whilst one embodiment of a responsive load system and method is described herein, changes to the system and method are envisaged without departing from the scope of the invention as defined in the appended claims. In particular, although reference is made herein to the load controller and the central controller being programmed to perform the functions required of them this functionality may be implemented through the use of bespoke ASIC processors. Also, network characteristics other than frequency may be monitored and used to trigger delivery of a responsive load service.

The invention claimed is:

1. A plurality of load controllers for together delivering a responsive load service to an electricity power supply network having a nominal operating value for a physical parameter of the electricity supply network, each load controller comprising:
   a parameter measuring device for regular measurement of the variable physical parameter of the electricity supply network, a power consumption controller for determining and for causing adjustment of the power consumption of at least one of one or more associated electrical loads to deliver the responsive load service in response to a detected difference between a recent measurement of the variable physical parameter of the electricity supply network and the nominal operating value of the physical parameter, wherein each of the one or more associated electrical loads has a respective threshold value and said adjustment is triggered if the measured physical parameter exceeds the threshold value, and a communication device adapted for receiving command signals from a remote controller, each command signal being representative of a responsive load service correction, wherein the each load controller is adapted to receive a command signal and apply the responsive load service correction to the one or more associated electrical loads as an offset to each respective threshold value of the measured physical parameter that triggers power consumption adjustments determined by the power consumption controller.

2. The plurality of responsive load controllers as claimed in claim 1, wherein the each load controller is adapted to apply a responsive load service correction as an offset to all power consumption adjustments until a new responsive load service correction is transmitted by the remote controller.

3. The plurality of responsive load controllers claimed in claim 1, wherein the each load controller is adapted to apply a responsive load service correction as an offset to all power consumption adjustments for a predetermined period of time.

4. The plurality of responsive load controllers as claimed in claim 3, wherein the predetermined period of time is at least 5 minutes, more preferably 30 minutes.

5. The plurality of responsive load controllers as claimed in claim 1, wherein the each load controller is a semi-autonomous load controller.

6. The plurality of responsive load controllers as claimed in claim 1, wherein the offset that is applied by the each load controller to the threshold value includes a multiplicative term, said multiplicative term being associated with the magnitude of the excursion of the measured physical parameter from its nominal value.

7. A remote controller for adjusting a responsive load service delivered by a plurality of electrical loads to an electricity power supply network having a nominal operating value for a variable physical parameter of the electricity supply network, the remote controller comprising:

a parameter measuring device for regular measurement of the variable physical parameter of the electricity power supply network, an analyser adapted to determine corrections to a responsive load service being delivered by the plurality of electrical loads, wherein a plurality of load controllers each control one or more of the plurality of electrical loads; and a communication device for transmitting command signals each representative of a determined responsive load service correction to the plurality of load controllers, wherein the determined responsive load service correction is applied to a responsive load service in which each of the plurality of electrical loads has a respective threshold value and said adjustment is triggered if the measured physical parameter exceeds the threshold value, and the responsive load service correction is adapted to be applied as an offset by each of the plurality of load controllers to the respective threshold value of the measured physical parameter that triggers power consumption adjustments determined by the plurality of load controllers.

8. The remote controller as claimed in claim 7, further adapted to transmit the responsive load service correction with a zero value where no correction is required.

9. A method of controlling a plurality of electrical loads coupled to an electricity power supply network having a nominal operating value for a variable physical parameter of the electricity power supply network to deliver a responsive load service by varying the power consumption of the plurality of electrical loads in response to a difference between an instantaneous measurement of the variable physical parameter of the electricity power supply network and its nominal operating value, said method comprising the steps of:

(i) regularly measuring the variable physical parameter of the electricity power supply network using a plurality of load controllers, each load controller in the vicinity of and in communication with one or more of the plurality of electrical loads and separately by a remote controller;

(ii) in response to a difference detected by the each load controller between a measured instantaneous value of the variable physical parameter and the nominal operating value, determining a power consumption adjustment and adjusting the power consumption of at least one of the one or more electrical loads in accordance with the determined power consumption adjustment to deliver the responsive load service independently of the remote controller, the delivered response being one in which each of the plurality of electrical loads has a respective threshold value and said adjustment is triggered if the measured physical parameter exceeds the threshold value;

(iii) the remote controller determining a responsive load service correction to the responsive load service being delivered;

(iv) transmitting a command signal representative of the determined responsive load service correction from the remote controller to each of the plurality of load controllers; and (v) the each load controller offsetting the respective threshold value of the measured physical parameter that triggers power consumption adjustments determined by the load controller in accordance with the determined responsive load service correction, thereby altering the responsive load service delivered to the electricity power supply network.

10. The method as claimed in claim 9, further comprising the steps of:

(vi) the each load controller transmitting to the remote controller service data on the magnitude of the responsive load service provided by the one or more electrical loads;

(vii) analysing the service data transmitted by the each load controller to identify tracking errors in the magnitude of the responsive load service provided; and (viii) determining and transmitting a responsive load service correction based upon an identified tracking error.

11. The method as claimed in claim 9, wherein the offset applied by the each load controller to all power consumption adjustments continues until a new responsive load service correction is transmitted by the remote controller.

12. The method as claimed in claim 11, wherein the remote controller determines that the responsive load service correction has a zero value where no correction is required.

13. The method as claimed in claim 9, wherein the each load controller applies the offset to all power consumption adjustments for a predetermined period of time.

14. The method as claimed in claim 13, wherein the predetermined period of time is at least 5 minutes, more preferably 30 minutes.

15. The method as claimed in claim 9, wherein the variable physical parameter is an operating frequency of the electricity supply network.

16. The method as claimed in claim 9, wherein the each load controller is in communication with the one or more associated electrical loads via a wired connection.

17. The method as claimed in claim 9, wherein the each load controller is a semi-autonomous load controller.

18. The method as claimed in claim 9, wherein the step of offsetting the threshold value includes applying an offset that includes a multiplicative term, said multiplicative term being associated with the magnitude of the excursion of the measured physical parameter from its nominal value.

* * * * *